United States Patent [19]

Courtney-Pratt et al.

[11] 3,846,009
[45] Nov. 5, 1974

[54] APPARATUS FOR ENHANCED DEPTH OF FIELD VIEWING

[75] Inventors: Jeofry Stuart Courtney-Pratt, Locust, N.J.; Richard Langton Gregory, Gloucestershire, England

[73] Assignee: Bell Telephone Laboratories, Incorporated, Murray Hill, N.J.

[22] Filed: Sept. 10, 1973

[21] Appl. No.: 395,398

[52] U.S. Cl. ................................. 350/87, 350/35
[51] Int. Cl. ......................................... G02b 21/06
[58] Field of Search ......... 350/87, 35, 36, 132, 286, 350/188, 204

[56] References Cited
UNITED STATES PATENTS
2,244,687  6/1941  Goldsmith et al. ................. 350/204
3,122,602  2/1964  Page ..................................... 350/87
3,687,520  8/1972  Nothnagle et al. ................. 350/35 X

*Primary Examiner*—Ronald L. Wibert
*Assistant Examiner*—Paul K. Godwin
*Attorney, Agent, or Firm*—Charles E. Graves

[57] ABSTRACT

A nonachromatic microscope objective is used to give substantially increased depth of field capability. A range of 100 microns is achieved instead of the 2 or 3 microns field depth to which conventional objectives of a similar lateral resolution are limited. Images from the nonachromatic objective are presented in 3-D for visual work with controlled depth magnification at any value up to 10,000X. This is achieved by use of optical deviators which deviate incident light frequencies by different amounts so as to effect at the eyes of the observer a different convergence of each frequency. Dark field illumination aids in viewing the 3-D displays produced.

13 Claims, 10 Drawing Figures

FOR SECONDARY IMAGE DISTANCE $v_2 = d_5$ (THE NEAR POINT), THE PRIMARY IMAGE DISTANCE $u_2' = F_2 \dfrac{m_2}{m_2 + 1}$

FIG. 9

INFINITE SECONDARY IMAGE DISTANCE $v_2'$ FOR PRIMARY IMAGE DISTANCE $u_2 = F_2$

APPARATUS FOR ENHANCED DEPTH OF FIELD VIEWING

FIELD OF THE INVENTION

This invention relates to optical imaging, and in particular to depth of field enhancement and, in a related sense, stereoimaging.

BACKGROUND OF THE INVENTION

High resolution imaging in microscopy normally requires an objective with a large numerical aperture. A large numerical aperture, however, severely limits the depth of field that can be achieved in the instrument.

High resolution imaging in stereomicroscopy has a related problem. The usual system involves two optical trains, one for each eye, which are arranged so that the optic axes converge on the specimen. At low magnifications, this system works satisfactorily, but for higher resolutions, objectives of higher numerical aperture are required. This in turn requires that the outside diameter of each objective be large relative to the working distance. As a result, it soon becomes impossible to place a pair of objectives sufficiently close together to preserve the needed angle of convergence. In practice, for many stereoscopic microscopes the maximum numerical aperture that can be accommodated is not greater than 0.1. Thus, useful magnification, as well as lateral resolution, are severely limited.

Accordingly, one inventive object is to enhanace the depth of field obtainable in a microscope, without sacrificing lateral resolution.

A further inventive object is to achieve preferred ways of scanning an object in depth.

A still further inventive object is to achieve a high resolution image in stereomicroscopy.

A more general inventive object is to provide preferred stereoscopic viewing apparatus for other than microscopic images.

SUMMARY OF THE INVENTION

Pursuant to one object of the invention, depth of field of a microscope is substantially enhanced by the use of a microscope objective which admits light over a substantial portion of the visible spectrum and includes means for bringing to focus on a single focal plane, specific but different wavelengths of light each emanating from an object plane at a different distance from the lens.

In a particular embodiment pursuant to this aspect of the invention, an object is illuminated with selected different wavelengths of light. Each selected wavelength brings into focus a part of the specimen lying in a different object plane in the field depth. Viewing in each object plane is optimal only with the illumination of the associated selected wavelength.

In a preferred embodiment pursuant to this aspect of the invention, the microscope objective achieves its change of focus with wavelength as a substantially linear function of wavelength over a significant range of the visible spectrum.

Extending this aspect of the invention, a system for stereoscopic viewing of an object is achieved by viewing of the object through the aforementioned microscope objective with a binocular eyepiece in which each of the two paths is fitted with an element that deviates incident light frequencies by different amounts, thereby to effect a different convergence of each frequency as presented to the eyes of the viewer. Advantageously, although not necessarily, these elements can be triple prisms so cut that a wavelength in the intermediate range of visible spectrum is undeviated. Furthermore, such a prism system if adapted to rotate about its optic axes will permit a selection of the greater convergence for either the blue end of the spectrum or the red end. This makes possible the examination of an object in orthoscopic or pseudoscopic three dimension.

In a still further extension of the invention, the prisms alone or their optical equivalent have been found capable of producing stereoscopic perception in applications beyond microscopy and including, for example, viewing of slides, transparencies, or luminous displays of all sorts The invention, its several facets, further objects, features, and advantages will be made apparent from a reading of the descriptions to follow of illustrative embodiments. A discussion of resolution and depth of field is found in the Appendix.

DETAILED DESCRIPTION OF ILLUSTRATIVE EMBODIMENTS

STEREO VIEWING APPARATUS COMPRISING OPTICAL DEVIATORS

A discussion will first be presented of the principle of obtaining stereoperception by use of optical deviators such as prisms placed in line of sight of the two eyes. As will be seen later on, the principle is applicable to microscope use when combined with other aspects of the invention.

Figure 1:
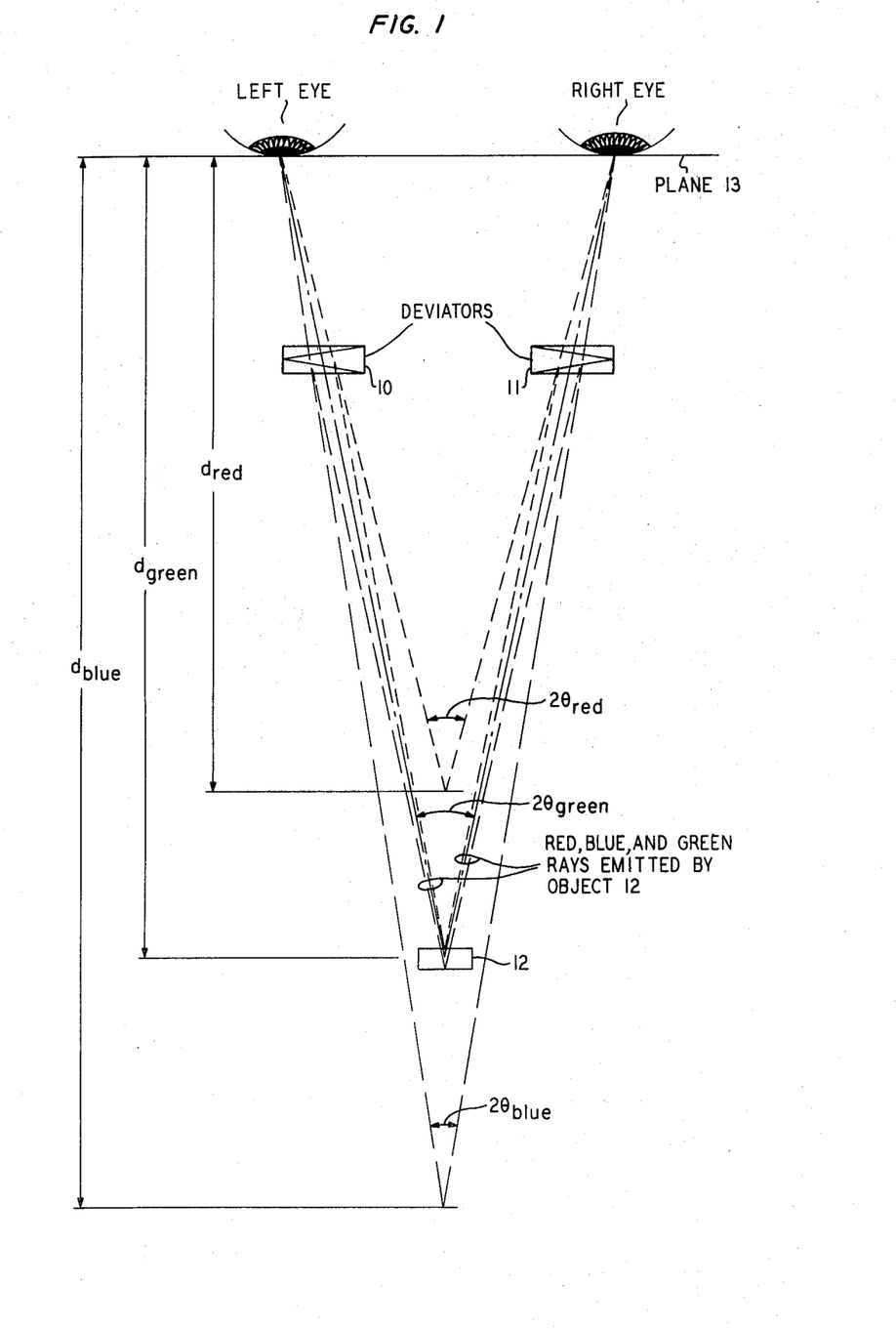
FIG. 1 is a line sketch of an optical system using only a pair of deviators to achieve stereoscopic effect.

As seen in FIG. 1, a pair of optical deviators 10, 11 are place respectively in lines of sight adaptable to the human left and right eye respectively. An object 12 emits a number of different color light waves which in this example are limited to the blue, red, and green. The deviators 10, 11 illustrated are triple prisms, in this instance; and these will be described in detail later on.

Red, blue, and green rays emitted by object 12 travel along the line of sight of the left and right paths, and pass through the deviators 10, 11 respectively. Each deviator is characterized by an ability to effect a different deviation of each frequency. Specifically, each deviator is placed so that the lines of sight for the right eye and the left eye are differently convergent for the red, blue and green rays.

For illustrative purposes, assume the green rays of FIG. 1 are undeviated. The green parts of object 12 will thus appear at a normal depth or distance, denoted $d_{green}$, from the eyes of the observer at plane 13, due to the undeviated convergence angle denoted $2\theta_{green}$. If now the red rays are given a different deviation from the green by virtue of the construction of deviators 10, 11, then the red parts of object 12 will appear to be at a different distance denoted $d_{red}$, which is appropriate to the red convergence angle $2\theta_{red}$. The angles $\theta_{red}$ and $\theta_{green}$ are different because of the varying deviation with wavelength of the deviators 10, 11. Similarly, the blue rays will appear to come from a distance denoted $d_{blue}$ which is appropriate to the blue convergence angle $2\theta_{blue}$. Again, $\theta_{blue}$ and $\theta_{red}$ are different from $\theta_{green}$, typically by plus or minus 1°.

FIG. 1 shows the red rays as deviating outward by more than the blue. If the deviators were interchanged but kept in the same orientation, the reverse would be the case. Alternatively, the deviators could both be rotated 180° about their optic axes to produce the same inversion of the stereoscopic effect.

Figure 2:
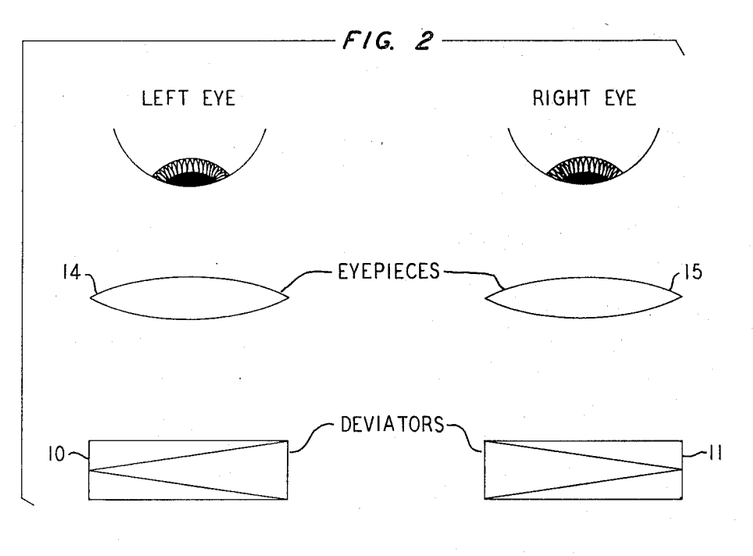
FIG. 2 is a variation of the FIG. 1 system, augmented by binocular eyepieces.

FIG. 2 shows a variation of the invention of FIG. 1, in which eyepieces are incorporated so as to facilitate the stereoscopic viewing of close objects or images.

NONACHROMATIC MICROSCOPE OBJECTIVE

Figure 3:
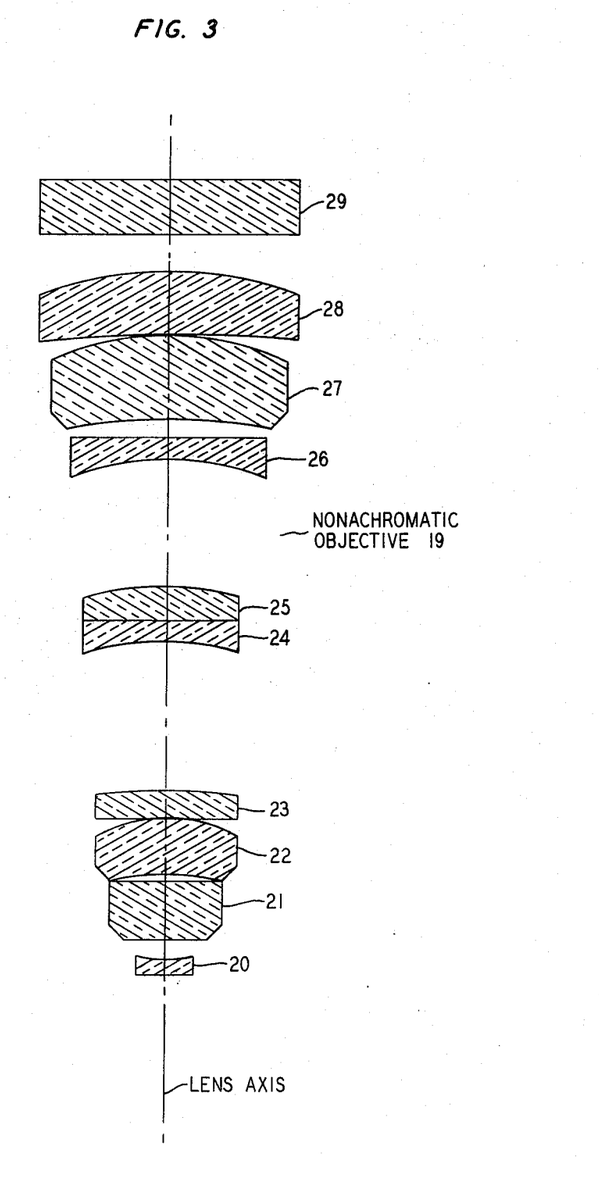
FIG. 3 is a longitudinal section of a lens system designed to be a nonachromatic objective.

An achromatic microscopic objective can bring to a focus in a single plane different wavelengths of light which all emanate from a single plane of the object. A *nonachromatic* objective has been made which brings to a focus in one plane (plane I of FIG. 5) rays of one monochromatic wavelength from some one plane in the object such as plane 36, and brings other wavelengths to a focus in the same plane (plane I) that have emanated from points in different planes in the object such as plane 37. This aspect of the invention involves a microscope objective which admits light over a substantial portion of the visible spectrum. Its internal construction achieves the foregoing characteristic and is illustrated in FIG. 3. This particular design is only one of many possibilities and consists of 10 coordinated lenses mounted in a housing, not shown. The lenses designated 20–29 are made of appropriate types of glass and in substantially the shapes shown.

Figure 4:
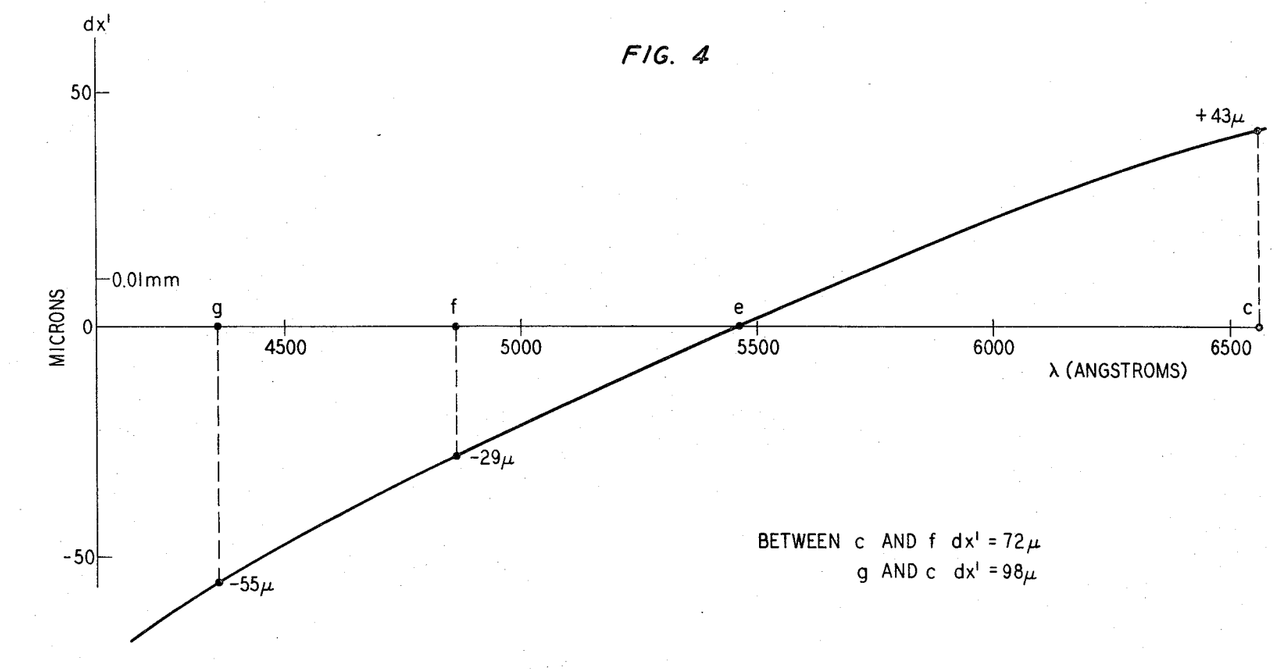
FIG. 4 is a graph depicting axial chromatism of the FIG. 3 objective.

The specific nonachromatic objective design, illustrated in FIG. 3, and designated 19, advantageously has an axial achromatism function such as illustrated in FIG. 4, which is substantially linear over the wavelength range of visible light. The linearity of the variation of the focal plane with wavelength is advantageous because it allows one to produce a relatively undistorted 3-D stereoscopic effect using linear deviation of light with wavelength in the deviators. The design depicted in FIG. 3 was computed first with the wavelength $\lambda = 546$ nanometers and further adjusted until precise imaging was obtained for all wavelengths in the range from $\lambda = 650$ to 450 nm. The objective advantageously has a nominal focal length of 16 millimeters and a numerical aperture of 0.4. Further, objective 19 advantageously has diffraction limited operation over a flat field one millimeter in diameter for all wavelengths in the visible range.

Importantly, the planes of focus for the red and blue ends of the visible spectrum are placed substantial distances apart when the enlarged images are all formed at a chosen tube distance conveniently of about 25 centimeters. As shown in FIG. 4 change of focus with wavelength is a smooth, monotonic and nearly linear function. A depth of field of 98 microns exists from $\lambda = 4,360$ A to $\lambda = 6,560$ A. For the specific objective used, tests indicate that wavefront errors are less than $\lambda/4$ at all points of the working range of wavelengths. In center field, wave aberrations are less than $\lambda/8$ for all wavelengths.

DEPTH SCANNING MICROSCOPE

Figure 5:
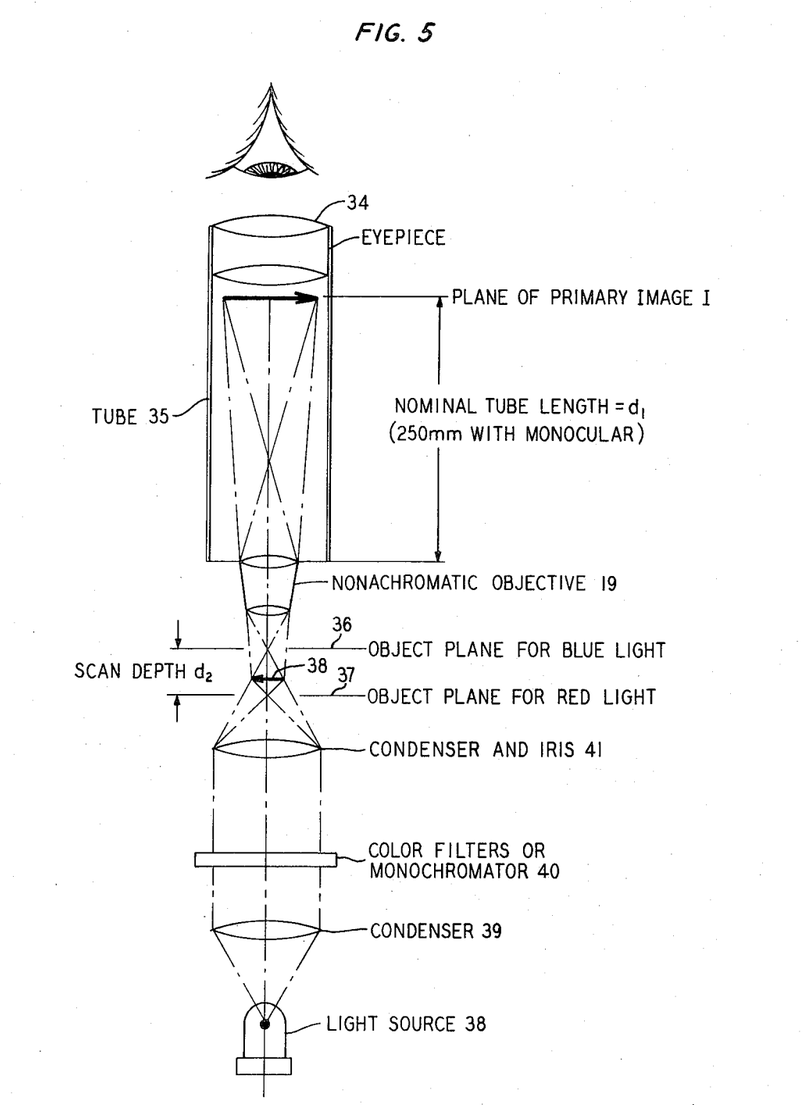
FIG. 5 is a diagram of the microscope using the objective of FIG. 3 to scan in depth.

The objective 19 described above may be adapted to scan a specimen in depth by its use in the apparatus depicted in FIG. 5. A monocular system consists of an eyepiece 34 and a tube 35 on which the objective 19 is mounted. The length of tube 35 from the primary image plane I–I to the principal plane of objective 19 is, for example, about 250 mm and is denoted $d_1$. The scan depth, $d_2$ is defined by the distance between the object plane 36 for blue light and the object plane 37 for the red light. The object in this scheme is illustrated by the arrow 38 which is intermediate the planes 36 and 37. For illumination, a white light source 38 is condensed as parallel light by a condenser 39 which feeds the element 40 which can be a color filter or a monochromator. The object arrow 38 is illuminated by the condenser and iris 41.

With this assembly it is quite simple to scan in depth, by changing the color of the illuminating beam. This can be achieved by the use of the mentioned color filters or a monochromator, or by using a lamp such as a mercury lamp that emits strongly at specified wavelengths. The images are sharp to the eye over all wavelengths. When photographed, the image resolution at any one wavelength is that to be expected from the numerical aperture of 0.4. Points in the image a micron apart can readily be distinguished.

MICROSCOPE FOR VIEWING OBJECT EITHER IN ORTHOSCOPIC OR PSEUDOSCOPIC THREE-DIMENSION

Binocular eyepieces of the type described are conventional in microscopy. See for example, the several illustrated in E. B. Brown, *Modern Optics*, Reinhold Publishing Corporation, 1965, at pages 310 et seq. Binocular eyepieces in microscopes normally view through a single objective, in which case, the binocular microscope does not give stereo vision. The latter usually requires in effect two complete microscopes mounted at a convergence angle which equals the normal convergence angle of the eyes. One of the problems with stereoscopic microscopy is that very high magnifications are not possible because of physical interference in the objective area for the very short working distances which would be required. This problem and others are overcome, however, pursuant to the following further aspect of the present invention.

Figure 6:
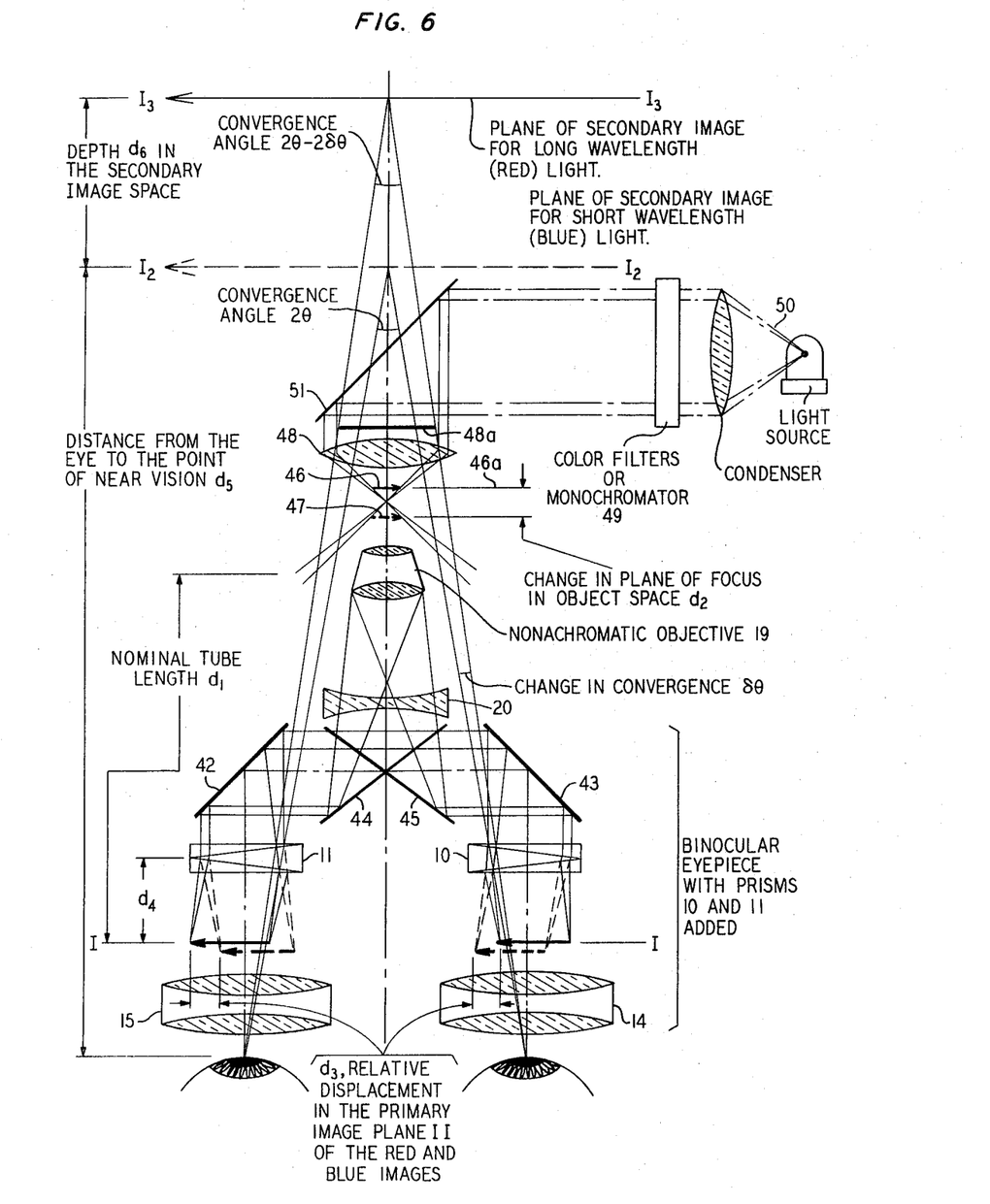
FIG. 6 is a diagram of a microscope using the FIG. 3 objective for three-dimensional viewing and/or for scanning in depth.

FIG. 6 combines the nonachromatic objective of FIG. 3, the binocular eyepiece described above, and the deviators described with respect to FIG. 1. The deviators 10, 11 are mounted in the binocular eyepiece which consists of eyepieces 14, 15 and the binocular mirror system consisting of mirrors 42, 43 and partially transmissive mirrors 44, 45. The object or specimen to be viewed is denoted by the arrow 46 which should be regarded as a three-dimensional object extending from plane 46a to plane 47. The FIG. 6 system has the capability of effecting a change in the plane of focus in the object space equal to a distance $d_2$. The objective 19 is placed at the end of a tube (not shown, but similar to that shown in FIG. 5), the nominal length of which is denoted $d_1$ in FIG. 6 as measured from the primary image plane I—I. The deviators 10, 11 are at a distance denoted $d_4$ from the image plane I—I beneath the eyepieces 14, 15.

The object 46 is illuminated by the system consisting of circular opaque mask 48a, dark field condenser 48, the color filters or monochromator 49 and the light source and condenser assembly 50 acting through the mirror 51.

TRIPLE PRISMS

Figure 7:
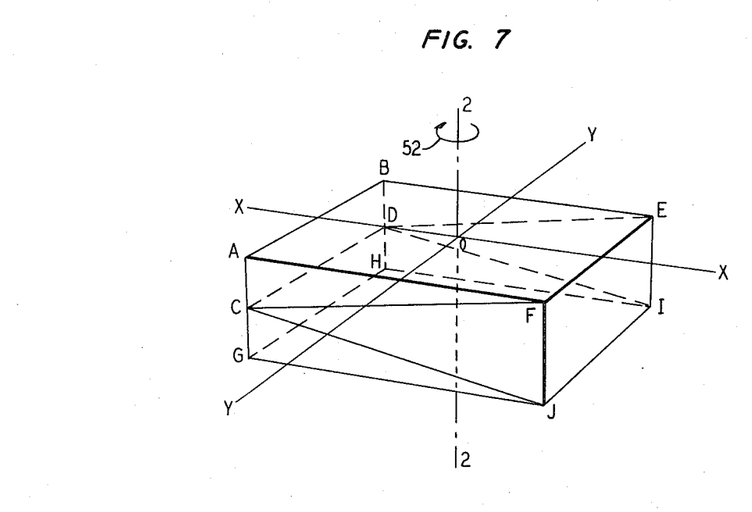
FIG. 7 is a side schematic perspective view of a triple prism type optical deviator, used either by itself as in FIG. 1 or in conjunction with the apparatus of FIG. 6.

FIG. 7 depicts a typical triple prism such as prism 11 which acts as a deviator. The prisms are so cut that the green ray at 5,100 angstroms is undeviated advantageously. The end faces A-B-E-F and G-H-I-J are parallel to one another and normal to the undeviated ray. Typically the aperture is 1.4 centimeters square and the length in a direction of the light path is 2.8 centimeters. The deviation at a few wavelengths is shown in Table I and is about 2½° from the blue to the red.

Table I

DEVIATION OF TRIPLE PRISMS 10 AND 11 WITH WAVELENGTH

| Wavelength | Deviation |
|---|---|
| Angstroms | Radians |
| 4360 | −0.0175 |
| 5100 | 0 |
| 5460 | +0.0077 |
| 5780 | +0.0133 |

At the center, the deviation is about 0.021 radians per 1,000 angstroms. The three components of the prism are selected so that a wavelength $\lambda_c$ approximately in the middle of the visible region is undeviated. Therefore, the deviation of prism J-F-E-I-C-D is for this wavelength equal and opposite to the sum of the deviations for the prisms A-B-D-C-E-F and C-D-H-G-I-J. Rotation of the triple prism about the optic axis 202 will make no difference to the direction of the undeviated central ray of wavelength $\lambda_c$, but the deviation of other rays can be adjusted in the right-left direction by this rotation.

It is convenient to choose glasses which have the same refractive index for the wavelength $\lambda_c$. For this case, faces A-B-E-F and G-H-I-J can then be parallel; and the two smaller prisms can be equal in shape, size, and material. The glasses for the larger prism and the two smaller prisms must, of course, have different dispersions as otherwise there will be no dispersion even for wavelengths other than $\lambda_c$.

Operation

With the prisms 10, 11 of FIG. 6 mounted two or three centimeters below the eyepieces 14, 15, the main lines of the mercury spectrum can readily be resolved. The green line at 5,460 angstroms is readily distinguished from the pair of yellow lines occurring at 5,780 angstroms. If the eyepiece tubes are extended so that the prisms are about 10 centimeters below the eyepieces 14, 15 (that is, $d_4 = 10$ centimeters), and if further, an eyepiece power of 10X or larger is used, then the two yellow lines at 5,770 and 5,790 angstroms can readily be distinguished from each other. It is thus possible to adjust the separation of the colored images in the eyepiece plane I—I, by choice of the dispersion of the deviating prisms, and/or by choice of the distance $d_4$.

If the prisms 10, 11 are mounted so that they can be rotated about the optic axes as denoted by the arrow 52 in FIG. 7, it is possible to have a choice of the greater divergence occurring for the blue end of the spectrum or for the red end of the spectrum. This makes possible the examination of an object in orthoscopic 3-D or pseudoscopic 3-D. A partial rotation of each prism about its axis allows the selection of any smaller convergence that might be desired.

It is often convenient to examine two planes in an object with both images apparently coplanar and then to rotate the prisms so that one color or the other separates in a depth dimension to a degree that is convenient for examination. If the object is, for example, 100 microns deep, images can be focused continuously from the red to the blue. So that the convergence is within the range for which one can get fusion of the image in the two eyes, the distance $d_4$ should be selected to be small; and/or one should use a small rotation of the prisms 10, 11 from their position of zero convergence.

If the object to be viewed has a depth of, for example, 14 microns, the appropriate wavelengths could for example be the green and the yellow of the mercury spectrum, as illustrated in FIG. 4. As large a deviation over this smaller wavelength range is nevertheless desirable to achieve appropriate convergence. Thus in this instance, the prisms would be most conveniently rotated to their positions of maximum convergence.

Example

Assume the object 46 in FIG. 6 has a depth $d_2$ of 14 microns. The focus in green light is on the face 47 of the object nearer the objective. The focus in yellow light is on the face farther from the objective. In the microscope depicted in FIG. 6 the magnification to the eyepiece plane I—I is for example, 40X. With $d_4 = 3.4$ centimeters, the displacement of the yellow and green images below either eyepiece is 3.4 centimeters X 0.0056 radians = 0.019 centimeters. The difference $\Delta\theta$ in convergence for each eye is 0.019 centimeters/$F_2$, where $F_2$ is the focal length of the eyepiece. For 20X eyepieces, $F_2$ is 1.25 centimeters. Thus, $\Delta\theta = 0.015$. Now, if the distance from the eye to the point of near vision, denoted $d_5$ in FIG. 6 is, for example, 25 centimeters for the green, then the apparent position of the yellow image is 28 centimeters. That is, the apparent depth $d_6$ is 3 cm. Thus, the depth magnification is: $d_6 \div d_2 = 3$ centimeters ÷ 14 microns, or a magnification of 2100:1 in depth.

Any smaller magnification in depth could be chosen by simple rotation of the prisms 10, 11 toward their zero convergency position. Furthermore, the lateral magnification would be 800X as follows: 40X from the objective 19 and 20X from the eyepieces 14, 15.

Many objects have been examined with this microscope and some kinds of images can clearly be seen in depth. Bright field or dark field illumination, of course, can be used when it is desired to examine with one wavelength at a time. However, for examination of several wavelengths at once, and particularly for viewing in 3-D, dark field illumination is desirable. A suitable condenser that has adequate depth of field is the standard Cooke macro dark field condenser with numerical apertures from NA 0.5 to 0.7. Other condensers are, of course, suitable; or simple oblique illumination can be adapted.

It is also possible to examine objects using crossed polarizers. The field then in general is dark, although small features that scatter light are visible as bright features in the appropriate colors. Viewing with cross polarizers is effective both for transillumination and for incident light work. It is sometimes possible to examine an object and obtain a useful three-dimensional display of it, even with bright field illumination, if the lighting is restricted to two wavelengths at any one time. There is, however, some loss of contrast as small dark features for one color are bright in the other color.

A Further Illumination Apparatus

As already depicted, the illumination for the inventive embodiment depicted in FIG. 6 can be a white light source followed by an adjustable monochromator to enable one to search in depth by changing wavelengths. However, the illuminating means can be a gas discharge lamp such as a mercury lamp or a white light source followed by a comb filter having a sequence of about eight passbands typically 10 or 20 angstrom units wide at half peak and separated by about 300 angstrom units. With this apparatus two or some other small number of planes at different depths can be viewed at the same time. The latter arrangement is more convenient for dark field illumination. The employment of a multiple passband interference filter provides a convenient sequence of lines, all adequately sharp. The passbands should be far enough apart that successive images of a point feature are well separated. Table II gives the positions and half-widths of the passbands for a typical such filter. Tilting the filter enables one to scan the passbands through a few hundred angstroms.

TABLE II

| Peak Wavelength | Half-peak Bandwidth | Transmission |
|---|---|---|
| A | A | % |
| 7380 | 20 | 78 |
| 7080 | 17 | 80 |
| 6700 | 15 | 78 |
| 6330 | 15 | 75 |
| 6000 | 15 | 68 |
| 5700 | 12 | 62 |
| 5450 | 12 | 65 |
| 5210 | 12 | 68 |

CHARACTERISTICS OF A MULTIPLE PASSBAND INTERFERENCE FILTER.

If a small bright feature is examined, using the apparatus depicted in FIG. 6 and a multiple pass filter like that just described, for the element 49, the image that is in focus is the smallest image. For example, with a feature at the limiting resolution of 1 micron in the object plane the size in the image plane is about $M$ microns in diameter, where $M$ is the overall magnification of say 800X. For the adjacent passband, the image is out of focus and the size is larger and the intensity less—often so much less that it and all more distant images are invisible or nearly so. This somewhat surprising result contributes significantly to the ease with which one can examine in depth images without undue distraction from unwanted image features.

It is to be understood that the embodiments described herein are merely illustrative of the principles of the invention. Various modifications may be made thereto by persons skilled in the art without departing from the spirit and scope of the invention.

APPENDIX

Resolution

No matter how precisely an objective is made, its resolution is limited by the wave nature of light. According to the Rayleigh criterion, two points may just be resolved if the maximum of one image falls on the first diffraction minimum of the other. The Rayleigh limit, therefore, for a microscope is given by $d_{Rayleigh} = 1.22 \lambda/2 NA$. Where $\lambda$ is the wavelength of light, and $NA$ is the numerical aperture of the objective — given (in air) by the sine of the semi-angle of the light cone. This formula assumes that the objective is uniformly filled with light — either by use of an appropriate condenser for bright field work, or because the object is emitting or scattering light uniformly.

For the objective described above, the $NA$ is 0.4.

| So, | for red light, | $\lambda = 6500A$, $d_{Rayleigh} = 1.0$ micron |
|---|---|---|
| | for green light, | $\lambda = 5460A$, $d_{Rayleigh} = 0.8$ micron |
| | for blue light, | $\lambda = 4360A$, $d_{Rayleigh} = 0.7$ micron |

In practice, points a micron apart at all these wavelengths can easily be distinguished.

Depth of Field

With microscopes there are three factors of components to be considered in estimating the depth of field:

1. The geometric depth — the depth one would estimate using the principles of simple geometric optics.
2. The diffraction depth — the depth due to the wave nature of light.
3. The accommodation depth — the additional depth because the eye of the viewer can change its focal length.

In photomicrography the criteria for the computation of these are different from the criteria for visual work; and in addition, because (3) above is not applicable the depth of field for visual work is always much more than in photomicrography. An extensive discussion of this subject is found in *Instrumental Optics* by G. A. Boutry (translated by R. Auerbach), Hilgr & Watts, London, 1961.

The Geometric Depth

The geometric depth of field $e_1$ is the depth assuming no accommodation of the eye. Suppose the angular resolution of the eye is $\epsilon$ ($\approx 1/2000$ radians). Suppose the magnification of the objective is $M_1$, and of the eyepiece is $M_2$; then the diameter of the permissible circle of confusion at the object plane $\approx \epsilon d_5/M_1M_2$ where $d_5$, as before, is the distance of the nearpoint, nominally 25 cm. Thus the depth of focus:

$$e_1 = \pm (1/2NA) \cdot (\epsilon d_5/M_1M_2)$$

(1)

For the objective 19, $NA = 0.4$. Taking $\epsilon = 1/2000$ and $M_1M_2 = 300$, $e_1 = \pm 0.5\mu$. That is, the total range of $e_1$ is $1\mu$.

The Diffraction Depth

Figure 8:
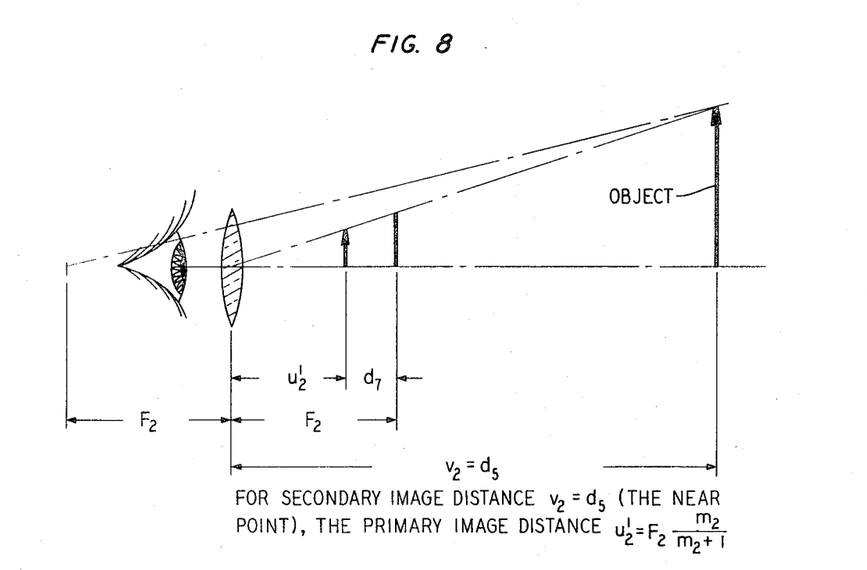
FIGS. 8, 9, and 10 are sketches which help define certain terms explained in the Appendix of this specification.
Figure 9:
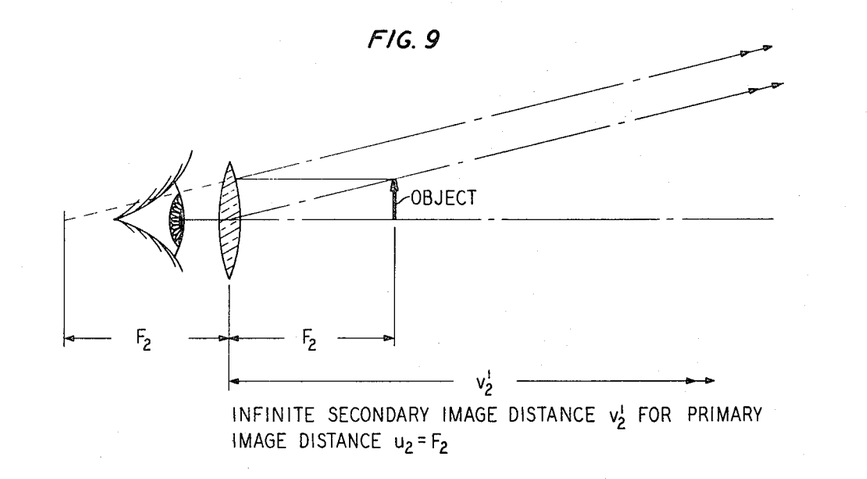

The depth of field due to the wave nature of light $e_2$ is given by Boutry (ibid p. 408)

$$e_2 = \pm n\mu/8(n \sin u/2)^2 \quad (2)$$

or approximately for small values of $u$ (ibid p. 407)

$$e_2 \approx \pm n\lambda/2(n \sin u)^2 \quad (2a)$$

where $n$ is the refractive index of the medium between the object and the objective and $n \sin u$ is the numerical aperture. So for the objective 19 where $n = 1$ and $\sin u = 0.4$ $e_2 = \pm \lambda/2(0.4)^2$ .... for $\lambda = 0.65\mu$, $e_2 = \pm 2\mu$
.... for $\lambda = 0.55\mu$, $e_2 = \pm 1.7\mu$
.... for $\lambda = 0.4\mu$, $e_2 = \pm 1.25\mu$ The Accommodation Depth The accommodation depth of focus $e_3$ is the depth of focus due to the ability of the eye of the viewer to accommodate its focus from a nearpoint (distant $d_5$) to a farpoint distant $d_8$. Conventionally we take $d_5 = 25$ cm and $d_8 = $ infinity, but it should be noted that even though these figures are reasonable for ordinary vision, the actual distances are often much more restricted when one is using an instrument like a microscope. Suppose the eyepiece has a focal length $F_2$ cm. The commercial magnification $M_2$ is $25/F_2$. Now refer to FIGS. 8 and 9. If we take the distance of the farpoint as infinity, the corresponding image distance is $F_2$. If we take the distance of the nearpoint as $d_5 = 25$ cm the corresponding image distance is displaced a distance $$d_7 = F_2/M_2 + 1 = \cong cm/M_2(M_2 + 1) \approx 25 \text{ cm}/M_2^2.$$

Figure 10:
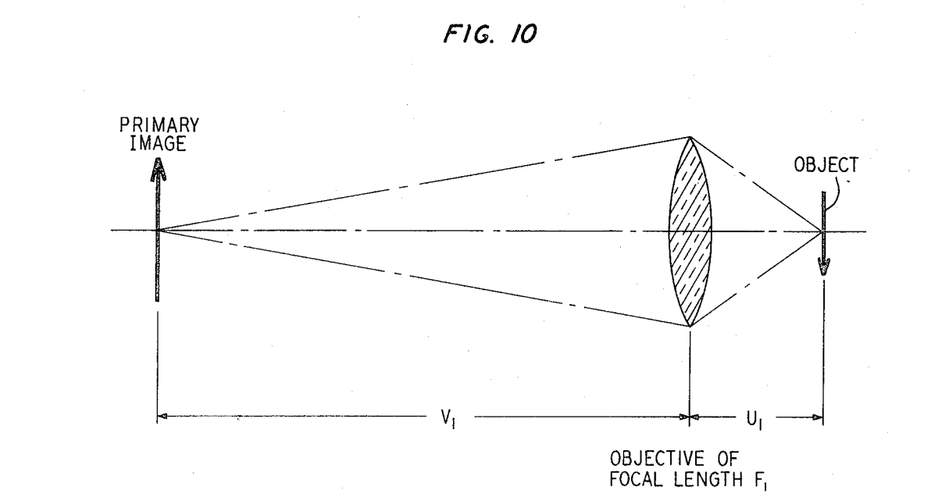

Consider next the allowable depth of focus in the object space that would produce this change in the position of the primary image. Refer to FIG. 10. The usual lens formula gives $$1/F_1 = 1/v_1 + 1/u_1 \quad (3a)$$

$$u_1 = F_1 V_1/v_1 - F_1 \quad (3b)$$

$$du_1/dv_1 = -[F_1^2/(v_1 - F_1)^2] \quad (3c)$$

The magnification of the primary objective is:

$$m_1 = v_1/u_1. \quad (4)$$

Therefore:

$$du/dv = -[(1/m_1^2) = -1/(M_1 - 1)^2] \quad (5)$$

where (in equation 5) $M_1 = v_1/F_1$.

So overall, the depth of focus $$e_3 = d_7/M_1^2 \approx 25/(M_1M_2)^2 \text{ cm} = 25/M^2 \text{ cm} \quad (6)$$

where $M$ is the overall magnification $M_1M_2$.

For example if
$M = 100, e_3 = $ 25 microns
$M = 300, e_3 = $ 3 microns
$M = 800, e_3 = $ 0.4 microns.

Combined Depth of Field

Rather surprisingly the overall depth of focus can be approxmated quite closely by simply summing the three components described above. Thus $e_{total} = e_1 + e_2 + e_3$. For example, with the objective 19 of focal length 16 mm, $NA$ 0.4, or indeed any other well corrected objective of similar focal length and numerical aperture, the computations work out much as follows:

| $e_1$ | $e_2$ |
|---|---|
| for $M = 300$, $e_1 = 1\mu$ | for $\lambda = 4000$A $e_2 = 2.5\mu$ |
| for $M = 800$, $e_1 = 0.4\mu$ | for $\lambda = 5500$A $e_2 = 3.4\mu$ |
| | for $\lambda = 6500$A $e_2 = 4\mu$ |

| $e_3$ | $e_{total}$ |
|---|---|
| for $M = 300$, $e_3 = 3\mu$ | for $M = 300$, $e_{total} \approx 7\mu$ |
| for $M = 800$, $e_3 = 0.4$ | for $M = 800$, $e_{total} \approx 4\mu$ |

In practice we find the depth of focus for monochromatic green light at high magnification (800X) is about 2 or $3\mu$ and at medium magnification (300X) is about $5\mu$. These figures should be compared with the depth of focus, given in FIG. 4, as one scans in wavelength. The scan depth is at least 100 microns — a considerable improvement over the depth of field available at any one monochromatic wavelength.

What is claimed is:

1. Apparatus for microscopically viewing a specimen over a large field depth, comprising:
    a microscope objective admitting light over a substantial portion of the visible spectrum and including means for bringing to focus in the same primary image plane at least two specific and different light wavelengths, each emanating from a different object plane within the field depth,
    means for mounting a specimen within a zone traversed by said different object planes, and
    means for illuminating said specimen with light including at least wavelengths of said two specific and different wavelengths.

2. Apparatus for microscopically scanning a specimen over a large field depth comprising:
    a microscope objective admitting light over a large portion of the visible spectrum and including means for bringing into focus in the same primary image plane a continuum of light wavelengths from within said visible spectrum portion, the wavelengths so brought to focus emanating from different zones within said field depth;
    means for mounting a specimen within said successive zones; and
    means for illuminating said specimen with light of one or more selected wavelengths from within said continuum of wavelengths.

3. Apparatus pursuant to claim 2, wherein the change of focus with wavelength associated with said objective is a substantially linear function over said continuous portion of said visible spectrum.

4. Apparatus pursuant to claim 2, wherein the change of focus with wavelength associated with said objective is a continuous and substantially linear function between the wavelengths of 4,360 A and 6.560 A.

5. Apparatus pursuant to claim 3 wherein said illuminating means comprises a white light source and monochromator means between said source and said specimen for varying the illuminating wavelength thereby to scan said specimen in depth.

6. Apparatus pursuant to claim 3, further comprising binocular eyepiece means for viewing said specimen through said objective, and an optical element in each of the right and left paths of said eyepiece, each said element comprising means for deviating each of said light wavelengths by differing amounts, thereby to effect a different convergence of each said wavelength when viewed by the eyes of an observer.

7. Apparatus pursuant to claim 6 wherein each said optical element has a deviation property of from 1° to 4° on either side of an undeviated frequency falling within the range of from 4500 A to 6,000 A.

8. Apparatus pursuant to claim 6, wherein said illuminating means comprises a white light source followed by a comb filter having a sequence of passbands each band separated from the adjacent bands, whereby different depths of said specimen can be viewed concurrently.

9. Apparatus pursuant to claim 8, wherein said passbands are substantially 10 A wide and said separation between adjacent said passbands is substantially 300 A.

10. Apparatus pursuant to claim 8, further comprising means for effecting dark field illumination of said specimen.

11. Apparatus pursuant to claim 6, wherein said illuminating means comprises a white light source and monochromator means between said source and said specimen for varying the illuminating wavelength thereby to scan said specimen in depth; and further comprising means for effecting dark field illumination of said specimen.

12. Apparatus pursuant to claim 7 wherein each said optical element comprises triple prism means each having parallel end faces disposed normal to the undeviated ray, and means for independently manipulating each said prism means so as to set the overall convergence of the right and left optic axes at a value in the range of from zero to 10°.

13. Apparatus pursuant to claim 12, further comprising means for separately rotating said prisms about their respective optic axes so as to effect the setting of the overall convergence.

* * * * *